UNITED STATES PATENT OFFICE.

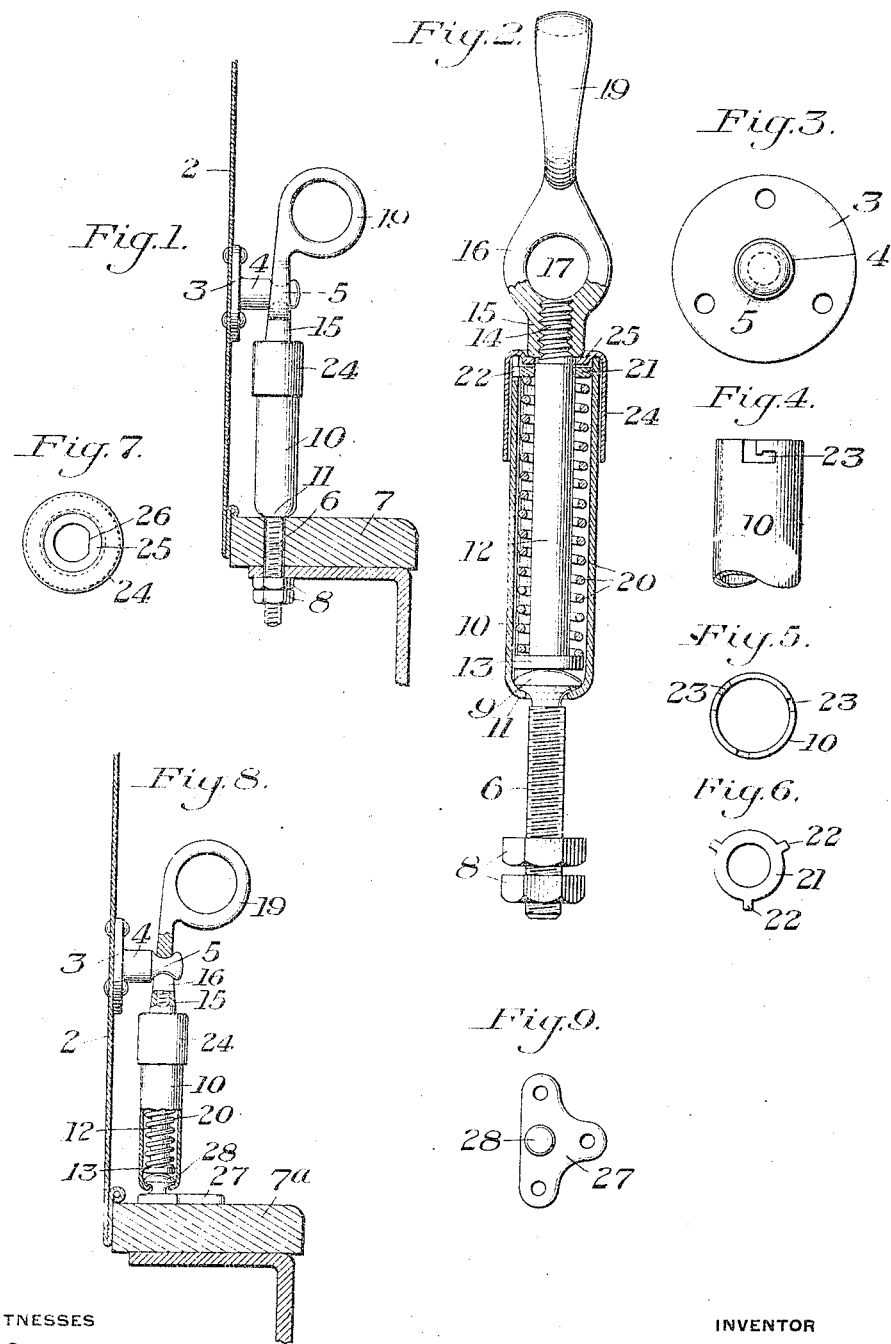

WILLIAM A. SCHLEICHER, OF CLEVELAND, OHIO.

HOOD-FASTENER FOR AUTOMOBILES.

1,159,870.

Specification of Letters Patent.

Patented Nov. 9, 1915.

Application filed July 13, 1915. Serial No. 39,575.

*To all whom it may concern:*

Be it known that I, WILLIAM A. SCHLEICHER, a citizen of the United States, residing at Cleveland, in the county of Cuyahoga and State of Ohio, have invented a new and useful Improvement in Hood-Fasteners for Automobiles, of which the following is a full, clear, and exact description, reference being had to the accompanying drawings, forming part of this specification, in which—

Figure 1 is a sectional elevation showing a portion of the hood and chassis of an automobile with my invention applied thereto; Fig. 2 is a sectional view on a larger scale of the fastener device. Fig. 3 is a plan view of the hood attachment; Figs. 4, 5, 6 and 7 are detail views hereinafter more fully described; Fig. 8 is a sectional elevation partly broken away; showing a modification of the invention; and Fig. 9 is a plan view of the modified form of foot piece shown in Fig. 8.

My invention has relation to a hood fastener for hoods of automobiles; and is designed to provide a simple, efficient and convenient form of fastener which can be readily applied to a car.

Referring to the accompanying drawings, the numeral 2 designates a portion of the metal hood of an automobile to which is attached a plate 3, having a laterally projecting stud 4, formed with a reduced neck portion 5.

6 designates a threaded bolt which is secured in the member 7 of the chassis frame by means of the nuts 8 on its lower portion, the bolt extending upwardly through said member 7 and having a ball head 9.

10 is a barrel or casing having its lower end portion turned inwardly, as indicated at 11, to form a concave socket bearing for the ball head 9 of the bolt 6.

12 is a stem which has a flange or head 13, at its lower end, seating upon the convex surface of the ball head and extending upwardly through the casing, its upper projecting threaded end portion 14 being formed to receive the screw socket 15 of a catch-piece 16. This catch-piece has an opening 17, adapted to fit over the stud 4, and is shown as having a portion above the opening 17, which forms a finger loop 19.

20 is a coiled spring seated at its lower end against the flange or head 13 of the stem 12 and at its upper end against a washer 21, within the upper portion of the casing, the spring being under compression between these end bearings. The washer 21 is shown (see Fig. 6) as having a plurality of radial projections 22, adapted for engagement with a plurality of bayonet slots 23 in the upper end portion of the barrel or casing 10 (see Figs. 4 and 5). By inserting the washer and then partially rotating it, it will be held in locked engagement with the undercut portions of the bayonet slots, thus securely retaining the spring under compression.

24 is a sliding cap which fits over the upper portion of the casing 10, and which has an inturned flange 25 at its upper end formed with a central opening for the stem 12. This flange is preferably cupped inwardly to receive the lower end of the catch-piece 16, the latter, when screwed to place, closing the opening and making the construction of the casing practically water-tight. That is to say, this construction prevents the water from getting into the spring from the top opening of the casing, whether the spring is compressed or extended and thus rusting the working parts. As shown in Fig. 7, the top opening in the cap 24, may be flattened at one side, as indicated at 26, for engagement with a correspondingly flattened portion of the stem 12, to thereby prevent rotation of the cap.

In operation, if the hood has been closed down, the cap piece is grasped by the finger loop 19 and is drawn upwardly against the tension of the spring 20, until the opening 17 can be slipped over the stud 4. The tension of the spring is sufficient to securely hold the parts in this position without any looseness or rattling. The ball-and-socket connection between the casing 10 and the bolt 6 permits the attachment to be given the necessary movement to be engaged with and disengaged from the stud 4.

In the modification shown in Figs. 8 and 9, the construction is, in general, the same as that first described, except that instead of the bolt 6 extending upwardly through the chassis member 7, I secure a foot plate 27 to the chassis member 7ᵃ, this foot plate having a ball-shaped stud or projection 28, in its upper surface. This projection corresponds to the ball-shaped head 9 of the bolt 6.

My invention provides an extremely simple and convenient hood fastening which is practically water-proof, in which rattling due to looseness of parts is prevented, and which can be readily applied to different types of automobiles. It will be seen that as many of the fastenings can be applied to a hood as may be desired.

I claim:

1. A hood fastener, comprising a barrel or casing, a stem within the barrel or casing and having upper and lower spring bearings with a threaded end portion projecting above the upper end of the casing, a spring under compression between the bearings, a cap piece attached to the stem and slidably mounted on the barrel, and a catch piece threaded upon the upper projecting end of the stem and securing and sealing the cap, substantially as described.

2. A hood fastener, comprising a member having a ball-shaped head and adapted for attachment with the chassis of an automobile, a barrel or casing having a lower portion pivotally embracing the said head to permit of a pivotal movement between the casing and the head, and a spring catch device carried by the casing, the upper end of the casing being closed in with a washer spring bearing, said bearing interlocking with the casing by means of bayonet slots, substantially as described.

In testimony whereof, I have hereunto set my hand.

WILLIAM A. SCHLEICHER.

Witnesses:
JOHN H. BAEHR,
FRED J. AHRENS.